April 7, 1970

F. ASPAAS

3,504,471

MOUNTING CONSTRUCTION FOR WINDOW PANE

Filed Nov. 2, 1966

INVENTOR:
FINN ASPAAS
BY Kurt Kelman
AGENT

United States Patent Office 3,504,471
Patented Apr. 7, 1970

3,504,471
MOUNTING CONSTRUCTION FOR WINDOW
PANE
Finn Aspaas, Tollbodgaten 19, Kristiansand S. Norway
Filed Nov. 2, 1966, Ser. No. 591,504
Claims priority, application Norway, Nov. 3, 1965,
160,134
Int. Cl. E06b 3/62
U.S. Cl. 52—400                                        5 Claims

ABSTRACT OF THE DISCLOSURE

Two mating glazing strips, between which a window pane is mounted and watertightly sealed, are securely locked together by interengaging complementary serrations on the strips. A reinforcing shoulder extends from the base into a recess in the bottom strip defined between two lips, one of the bottom strip lips sealingly engaging the pane and the other slip sealingly engaging the base.

---

Figure 1:
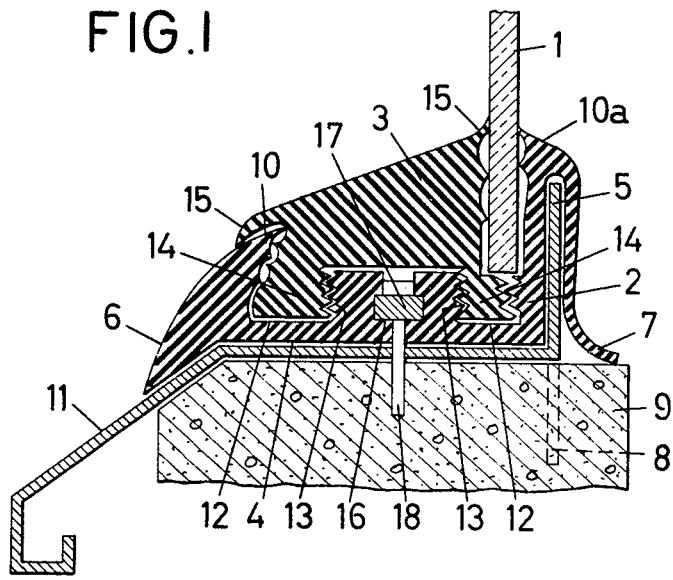

The present invention relates to means for watertight mounting of panels in apertures, and a main object of the invention is to provide a means of this kind, which securely and resiliently supports the panels in the frame or aperture, providing watertight sealing between the exterior and the interior and protecting all metal parts such as frames or reinforcements from corrosion.

A further object of the invention is to provide a means of the above said kind, which is easily and quickly mounted and has sufficient strength to withstand atmospheric forces, simultaneously being adjustable within wide tolerances of the building aperture.

Several methods have been proposed for mounting of panels, such as glass, but not one of the previously known systems contemplates all the above said objects or solves all the problems arising in connection with modern building constructions.

According to the invention all the above objects are achieved by the mounting and sealing a panel having a circumferential edge portion on a base, such as a window frame, by means of a pair of mating strips of resilient material, such as rubber. A bottom one of the strips sealingly engages the base and has lip portion extending over and in sealing engagement with the circumferential panel portion. A top one of the strips is mounted over and sealings engages the circumferential panel portion, the strip portions defining a sealed recess in which the circumferential panel portion is mounted and sealed. Interengaging complementary serrations on the strips lock the same together. A shoulder extends from the base adjacent and parallel to the circumferential panel portion, and the bottom strip has another lip extending from the bottom strip lip portion into sealing engagement with the base. The lip portion and the other lip define therebetween an elongated recess whereinto the shoulder extends.

According to one embodiment, the shoulder is one leg of an angle iron, the other leg thereof extending between the base and the bottom strip and being held on the base by the bottom strip. The other leg extends beyond the base to form a window sill, and the bottom strip has a further lip opposite the other lip in sealing engagement with the window sill. Preferably, the top strip has two projecting portions mating with two recesses in the bottom strip extending in the direction of the panel, the serrations being provided in the recesses and the projecting portions.

Further features and advantages of the invention will appear from the following detailed description with reference to the drawing wherein.

Figure 2:
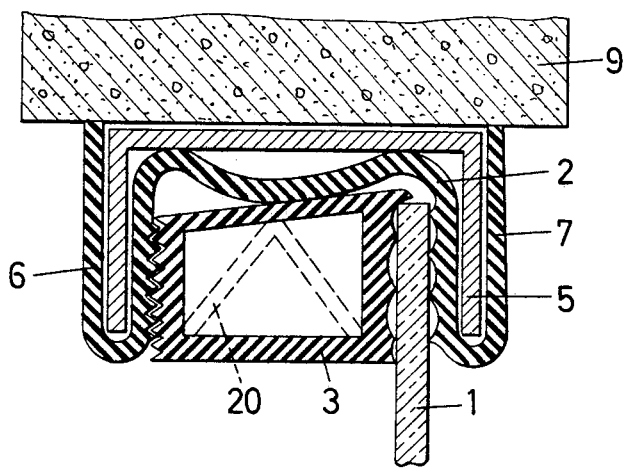

FIG. 1 is a vertical sectional view of the construction according to one embodiment of the invention; and FIG. 2 is a similar view of another embodiment.

FIG. 1 shows a section of the bottom of a window wherein is mounted a window pane 1 by means of mating bottom rubber strip 2 and top rubber strip 3. The pane 1 is held in water-tight sealing engagement in a recess defined between the resilient lip portion 10a of the bottom strip, which extends over and in sealing engagement with the circumferential portion of pane 1, and a resilient portion 15 of the top strip which also sealingly engages the circumferential portion of the pane. The bottom strip 2 has a substantially flat lower surface 4 for engagement with a conforming surface of base 9 or, as illustrated, an interleaved leg of an angle iron whose other leg 5 forms a shoulder extending from the base adjacent and parallel to the circumferential portion of pane 1.

In the illustrated embodiment, the leg of the angle iron is held on the base by the bottom strip and extends beyond the base 9 to form a window sill 11, the bottom strip having a further lip 6 in sealing engagement with the window sill.

The bottom strip 2 has another lip 7 opposite lip 6, and facing towards the interior, the lip 7 extending into sealing engagement with base 9 and defining a recess into which shoulder 5 extends. In this manner, the angle iron is watertightly sealed between the base and the bottom glazing strip. As indicated at 8, the shoulder 5 may simply have an extension anchoring it in the base, rather than being constituted as a leg of an angle iron.

The bottom strip has two recesses 12, 12 extending in the direction of pane 1 and the top strip has two projecting portions 14, 14 mating with these recesses. Interengaging complementary serrations 13, 13 are provided in the recesses and the projecting portions for locking the two glazing strips securely together.

The top strip has a sloping surface extending between lips 15, 15, one of these lips resiliently and watertightly engaging the pane 1 and the other lip extending over an inwardly extending lip 10 of the bottom strip for watertight sealing. The sloping surface between lips 10 and 6 of the bottom strip continues the slope to windows sill 11.

The bottom strip 2 is provided with a groove or recess 16 which holds a reinforcing iron strip 17 running the entire length of the strip, and strip 2 is fixed to base 9 by bolts or screws 18, which also fix the reinforcing strip in position. If desired, a sealing compound or gasket may be provided over the reinforcing strip to seal the recess 16.

It will be noted that the top strip 3 is itself held in locked position with bottom strip 2 by means of panel 1. It will be further understood that the commonly encountered wide tolerances of the window opening do not render the construction of this invention useless because the panel may be moved lengthwise, i.e. vertically in the drawing, and still maintain the required watertight sealing.

In the embodiment of FIG. 2, a channel iron is mounted on base 9, the channel iron presenting two parallel shoulders 5′. The bottom glazing strip 2′ has an interior portion of U-shaped cross section whose two legs form lips or walls adjacent the shoulders and wherefrom extend respective lips 7′ into sealing engagement with the base, the shoulders extending into elongated recesses defined between the lips. The top strip is a hollow member reinforced by internal supporting ribs 20 and having two opposite walls. One of the walls sealingly engages the pane 1 and the opposite wall extends along the upwardly extending lip or wall of the bottom strip, serrations being provided therebetween for locking the two strips securely together. It will be noted that the channel iron is fully protected by the bottom strip.

What is claimed is:

1. In a construction for mounting and sealing a panel having a circumferential edge portion on a base, comprising a pair of mating strips of resilient material, a bottom one of the strips sealingly engaging the base and having a lip portion extending over and in sealing engagement with the circumferential panel portion, a top one of the strips mounted over and sealingly engaging the bottom strip, the top strip also having a portion sealingly engaging the circumferential panel portion, the strip portions defining a sealed recess in which the circumferential panel portion is mounted and sealed, the improvement of interengaging complementary serrations on the strips for locking the same together, a shoulder extending from the base adjacent and parallel to the circumferential panel portion, the shoulder being one leg of an angle iron, the other leg of the angle iron extending between the base and the bottom strip and being held on the base by the bottom strip, and said other leg extending beyond the base to form a window sill, and the bottom strip having another lip extending from the bottom strip lip portion into sealing engagement with the base, the lip portion and the other lip defining therebetween an elongated recess whereinto the shoulder extends, and the bottom strip having a further lip opposite the other lip in sealing engagement with the window sill.

2. In the improvement of claim 1, the bottom strip having two recesses extending in the direction of the panel, and the top strip having two projecting portions mating with said two recesses, the serrations being provided in said recesses and projecting portions.

3. In the improvement of claim 2, the top strip having a sloping surface extending from the circumferential panel portion to the bottom strip, a lip extending from the sloping surface over the further lip of the bottom strip and in sealing engagement therewith, and the further lip of the bottom strip having a sloping surface in continuation of the sloping surface of the top strip and extending to the window sill.

4. In a construction for mounting and sealing a panel having a circumferential edge portion on a base, comprising a pair of mating strips of resilient material, a bottom one of the strips sealingly engaging the base and having a lip portion extending over and in sealing engagement with the circumferential panel portion, a top one of the strips mounted over and sealingly engaging the bottom strip, the top strip also having a portion sealingly engaging the circumferential panel portion, the strip portions defining a sealed recess in which the circumferential panel portion is mounted and sealed, the improvement of interengaging complementary serrations on the strips for locking the same together, a shoulder extending from the base adjacent and parallel to the circumferential panel portion, another shoulder extending from the base and spaced from the shoulder adjacent the panel portion, and the bottom strip having two other lips, one of the other lips extending from the bottom strip lip portion into sealing engagement with the base, the latter lip portion and said one other lip defining therebetween an elongated recess whereinto the shoulder extends, and the other one of the other lips also extending into sealing engagement with the base and defining with an upwardly extending portion of the bottom strip another one of said elongated recesses wherein the one shoulder extends.

5. In the improvement of claim 4, the top strip having two opposite walls, one of the walls constituting the portion sealingly engaging the circumferential panel portion, and the opposite wall extending along the upwardly extending portion of the bottom strip, the serrations being provided in said opposite wall and upwardly extending portion.

References Cited

UNITED STATES PATENTS

| | | | |
|---|---|---|---|
| 2,761,535 | 9/1956 | Englehart | 52—400 |
| 3,012,642 | 12/1961 | Emmerich | 52—400 |
| 3,107,939 | 10/1963 | Meyer | 52—400 |
| 3,344,573 | 10/1967 | Martin | 52—400 |
| 3,360,893 | 1/1968 | Wattelez | 52—400 |

FOREIGN PATENTS

| | | |
|---|---|---|
| 1,043,364 | 6/1953 | France. |
| 1,319,175 | 1/1963 | France. |

REINALDO P. MACHADO, Primary Examiner

U.S. Cl. X.R.

52—502